United States Patent
Mäder

(10) Patent No.: US 9,211,943 B2
(45) Date of Patent: Dec. 15, 2015

(54) INTERIOR EQUIPMENT ELEMENT FOR VEHICLE CABINS

(75) Inventor: Jörg Mäder, Gussenstadt (DE)

(73) Assignee: DIEHL AIRCABIN GMBH, Laupheim/BRD (DE)

( * ) Notice: Subject to any disclaimer, the term of this patent is extended or adjusted under 35 U.S.C. 154(b) by 403 days.

(21) Appl. No.: 13/016,108

(22) Filed: Jan. 28, 2011

(65) Prior Publication Data

US 2012/0082856 A1    Apr. 5, 2012

(30) Foreign Application Priority Data

Oct. 1, 2010  (DE) .................... 20 2010 013 869 U

(51) Int. Cl.
| | | |
|---|---|---|
| B32B 3/12 | (2006.01) | |
| B32B 17/10 | (2006.01) | |
| B64C 1/06 | (2006.01) | |
| B64C 1/14 | (2006.01) | |

(52) U.S. Cl.
CPC . *B64C 1/066* (2013.01); *B32B 3/12* (2013.01); *B32B 17/10* (2013.01); *B64C 1/1484* (2013.01)

(58) Field of Classification Search
None
See application file for complete search history.

(56) References Cited

U.S. PATENT DOCUMENTS

| | | | | |
|---|---|---|---|---|
| 4,204,025 | A * | 5/1980 | LeGrand et al. | 428/409 |
| 4,824,722 | A * | 4/1989 | Jarrett | 428/430 |
| 2006/0240242 | A1* | 10/2006 | Raghavendran et al. | 428/304.4 |
| 2009/0142604 | A1* | 6/2009 | Imai et al. | 428/447 |

\* cited by examiner

*Primary Examiner* — Ramsey Zacharia
(74) *Attorney, Agent, or Firm* — Scully Scott Murphy and Presser

(57) ABSTRACT

An interior equipment element 2 for vehicle cabins, in particular of aircraft. The interior equipment element 2 consists of at least one first portion 7, on the surface of which there is applied.

8 Claims, 2 Drawing Sheets

INTERIOR EQUIPMENT ELEMENT FOR VEHICLE CABINS

BACKGROUND OF THE INVENTION

The present application relates to an interior equipment element for vehicle cabins, in particular those of aircraft.

Interior equipment elements such as cladding or ceiling panels, items of furniture, partitions and the like have to possess and/or are intended to possess certain properties for their use in aircraft. Amongst these properties are included low weight, high strength, high fire and heat resistance, scratch resistance, sound-damping and the like.

DISCUSSION OF THE PRIOR ART

Heretofore known interior equipment elements, in particular wall and ceiling cladding, meet the requirements with regard to fire protection, but with regard to the further requirements there is still a need for improvement, in particular as regards the simultaneous implementation of several of the aforementioned properties. For example, highly scratch-resistant materials which fall within the scope of the further requirements frequently have a relatively high weight. On the other hand, materials which dampen sound efficiently generally do not have the required strength, or suitably strong and scratch-resistant materials exhibit poor sound damping properties.

These observations apply, in particular, to glass, which is relatively heavy but has a high scratch resistance and high fire and heat resistance. As a result, in aircraft cabins, generally glass substitute materials are used. These glass substitute materials, however, frequently do not exhibit the desired properties of high scratch resistance.

SUMMARY OF THE INVENTION

Proceeding therefrom, it is an object of the invention to eliminate the drawbacks according to the prior art. In particular, an improved interior equipment element is intended to be provided for vehicle cabins, in particular for cabins of aircraft. A vehicle cabin and a vehicle are also intended to be set forth.

This object is achieved by the features of the independent claims. Further embodiments are derived from the dependent claims.

According to a first feature, an interior equipment element is provided for a vehicle cabin. The vehicle cabin may, in particular, be a cabin, in particular a passenger cabin, of an aircraft. The interior equipment element comprises at least one first portion, on the surface thereof a glass coating being applied. Through such a glass coating, a particularly scratch-resistant surface may be obtained. Moreover, the interior equipment element is less heat sensitive in the region of the glass coating, and additionally may be relatively easily cleaned.

The at least one first portion of the interior equipment element may comprise a specific carrier substrate for the glass coating. The carrier substrate may be produced from a composite material, in particular a laminate and/or a plastics material. Many composite materials, such as resin-impregnated fibre materials, in particular prepregs, and the like, and plastics materials constitute lightweight construction materials, which for this particular reason are advantageous in the field of application of air travel.

The carrier substrate may be a transparent material, in particular a transparent plastics material. A plastics pane, correspondingly provided with a glass coating, may be used as glass substitute. In this connection, the known advantageous properties of glass such as scratch resistance and heat resistance, in particular fire retardance, may be utilized advantageously, at the same time a high quality appearance being able to be achieved.

In particular with glass substitute elements, i.e. transparent portions of the interior equipment element, it is advantageous if a glass coating is applied on both sides of the carrier substrate. A corresponding glass substitute element produces the full appearance of a glass pane, making use of the low weight of the carrier material. In the widest sense, a corresponding glass substitute element may be denoted as a composite pane. A composite pane formed as a glass substitute may thus comprise a relatively lightweight plastics core provided on one or both sides with a glass coating. Moreover, glass substitute elements which are curved in any manner may be easily produced, which is frequently required in vehicle cabins.

The interior equipment element may also comprise a second portion, preferably produced from a composite material. This second portion is not necessarily provided with a glass coating. The second portion is connected to the first portion by a material connection, positive connection and/or non-positive connection. In this case, the first and the second portion may be fixedly connected together. For example, the first portion may be incorporated in the second portion, which is possible, for example, when the second portion is produced in a lamination process, and the first portion is joined to the second portion in the lamination process. If required, for example in order to permit a replacement of the glass substitute elements, the first portion may also be releasably connected to the second portion, for example by a releasable adhesive connection or a latching connection and the like.

The interior equipment element for a vehicle cabin may, in particular, form a portion of a cladding element, in particular a wall cladding element, in particular a side wall cladding element, a ceiling element, in particular a dome-like ceiling element, a partition element, an item of furniture, a door element, a window element or any other equipment or fitting element.

A second feature relates to a vehicle cabin comprising at least one interior equipment element according to at least one of the previously disclosed embodiments. A third feature relates to a vehicle, in particular an aircraft, comprising an aforementioned vehicle cabin. Regarding the advantages and advantageous effects of the invention, reference is made to the embodiments in connection with the first feature of the invention.

BRIEF DESCRIPTION OF THE DRAWINGS

An exemplary embodiment of the invention is described in more detail hereinafter with reference to the accompanying figures, in which.

DETAILED DESCRIPTION OF THE INVENTION

Figure 1:
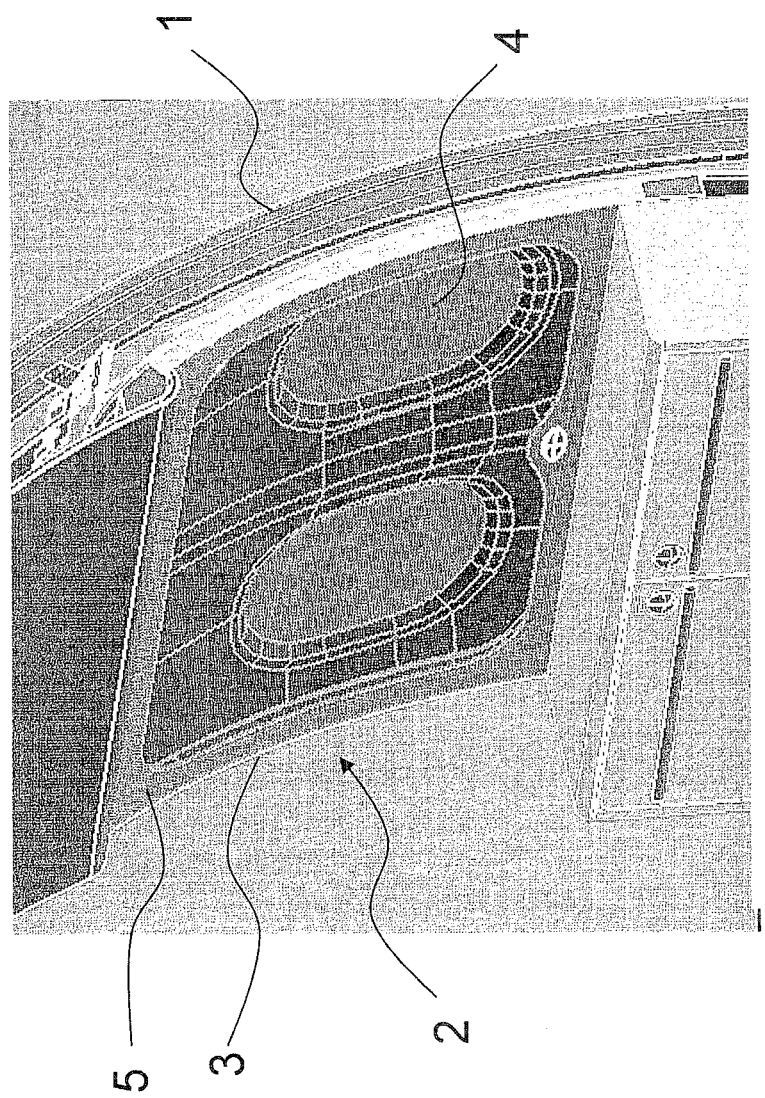
FIG. 1 shows an interior equipment element of an aircraft cabin.

FIG. 1 shows a portion of a cabin of an aircraft. In the view, the cabin has an interior equipment element 2 attached to an outer shell 1 of the aircraft. In the present case, the interior equipment element 2 is side wall cladding 3 in the region of two windows 4 incorporated in the outer shell 1. Between the outer shell 1 and the interior equipment element 2, the windows 4 are provided on the edge with frame-like cladding elements, not disclosed further here. The interior equipment element 2 arranged upstream of the windows 4 in the direction of the cabin interior, and/or the side wall cladding 3, comprises a frame 5 and a pane 6 held in the frame 5.

Figure 2:
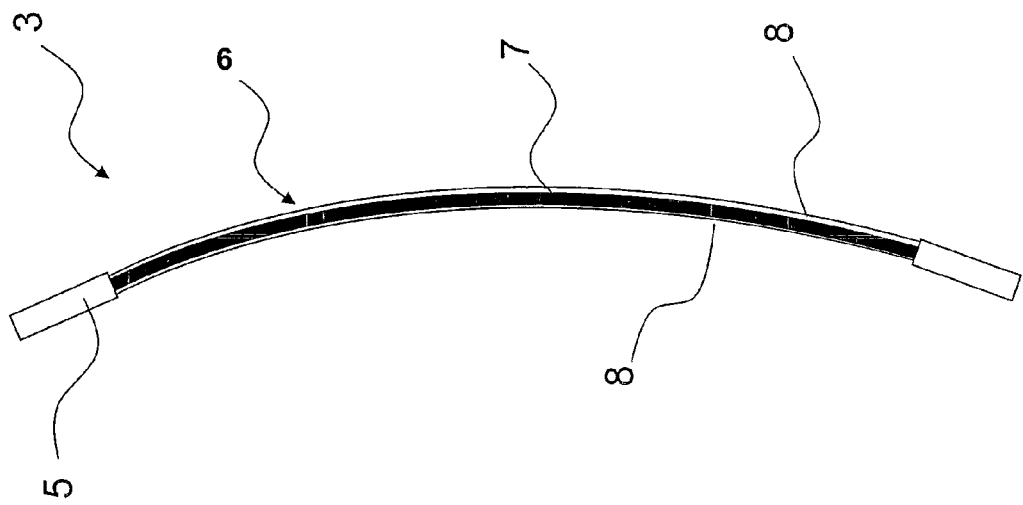
FIG. 2 shows a cross section of a portion of the interior equipment element.

The construction of the side wall cladding 3 is described in more detail in connection with FIG. 2, which shows a cross section of a portion of the side wall cladding 3. The pane 6 of the side wall cladding 3 comprises an optically transparent carrier material 7, which is provided on both sides with a glass coating 8. The glass coating 8 has a comparatively small thickness relative to the thickness of the carrier material 7. The thickness of the glass coating 8 is, in any case, selected so that, mechanically, said glass coating is sufficiently stable, and optionally further requirements are fulfilled.

The carrier material 7 may, in particular, be an optically transparent, preferably clear plastics material, in particular a plastics pane. The carrier material 7 may thus be constructed in a single piece, i.e. from a single material. It is also possible that the carrier material 7 is configured as laminate or composite material.

The pane 6 is, as already mentioned, held by or in the frame 5. In this connection, it is possible that the pane is held by a material connection, positive connection and/or non-positive connection. In particular, adhesive connections, latching connections, tongue and groove connections, retaining clamps, retaining strips, clamped connections and the like are considered. It is also possible that the pane 6 is connected to the frame 5 during the production of the frame 5. In particular, when the frame 5 is produced as a multi-layered element the pane 6 may be incorporated during the production of the frame 5. If the frame 5 comprises, for example, a honeycomb core reinforced by fibre mats impregnated with resin, it is possible that, during the curing of the resin, the pane 6 is laminated along the edge and thus fixedly connected to the frame 5.

In the figures, the interior equipment element 2 has been substantially disclosed as side wall cladding 3. This, however, is not intended to be understood as a restriction. Within the meaning of the invention, it is also possible that the interior equipment element is generally a cladding element. Such cladding elements may, for example, be used as wall cladding, ceiling cladding and the like. Thus the interior equipment element may also simply form a portion of a larger cladding element, to which the interior equipment element is fastened.

Apart from this, it is also possible that the interior equipment element forms a partition or a part of a partition between individual cabin regions or cabin portions.

Moreover, the interior equipment element may be used as a door or window element, or may be used as a component of a door or a window of the cabin. It is also conceivable that the interior equipment element is a component of an item of furniture or any other equipment or fitting element for the cabin. The term "item of furniture" is intended, therefore, generally to be understood in the sense of a furniture-like equipment element or fitting element for a vehicle cabin, in particular of an aircraft. Thus, in particular, equipment elements or fitting elements or fittings are considered which are fixedly mounted and/or installed in the vehicle cabin and/or incorporated in the vehicle cabin and, in particular, depending on their meaning and purpose, fulfill the function of a conventional item of furniture or fitting. Moreover, all types of movable fittings are considered.

A glass coating 8 applied to an optically transparent carrier material 7, as in the exemplary embodiment disclosed in the figures, may also be used in any other carrier materials which are also not transparent. The advantage of such a glass coating is that lightweight construction elements may be provided at least partially with the advantageous properties of the glass material, such as scratch resistance, heat resistance, easy cleaning, and the like, without the weight of the lightweight construction element being significantly increased. Additionally, a high quality appearance may be produced for corresponding interior equipment elements.

LIST OF REFERENCE NUMERALS

1 Outer shell
2 Interior equipment element
3 Side wall cladding
4 Window
5 Frame
6 Pane
7 Carrier material
8 Glass coating

What is claimed is:

1. An interior equipment element for a vehicle cabin, comprising:
    at least one first portion having a surface;
    a coating on the surface, the coating being made of a transparent glass material,
    wherein the at least one first portion comprises a carrier substrate for applying the coating, wherein the carrier substrate is made from a transparent plastic material and the entire carrier substrate is transparent, and
    a second portion made from a composite material, the second portion comprising a honeycomb core reinforced by fiber mats impregnated with resin, such that the at least one first portion is fixed to the second portion while the resin is being cured.

2. The interior equipment element according to claim 1, wherein the carrier substrate has two sides, on each of which side a glass coating is applied.

3. The interior equipment element according to claim 1, wherein said equipment element forms at least one portion of a cladding element.

4. The interior equipment element according to claim 3, wherein said cladding element comprises, selectively, a wall cladding element, a ceiling element, a partition element, an item of furniture, a door element and/or a window element.

5. The interior equipment element according to claim 4, wherein the wall cladding element comprises a side wall cladding element.

6. A vehicle cabin comprising at least one interior equipment element according to claim 1.

7. A vehicle comprising a vehicle cabin according to claim 6.

8. The interior equipment element according to claim 1, wherein the at least one first portion comprises a laminate material.

* * * * *